US008613105B2

(12) United States Patent
Shaikh

(10) Patent No.: US 8,613,105 B2
(45) Date of Patent: Dec. 17, 2013

(54) METHOD AND APPARATUS FOR STORING CONFIDENTIAL INFORMATION

(76) Inventor: Mohammed Naser S. Shaikh, Santa Barbara, CA (US)

( * ) Notice: Subject to any disclaimer, the term of this patent is extended or adjusted under 35 U.S.C. 154(b) by 183 days.

(21) Appl. No.: 12/508,553

(22) Filed: Jul. 23, 2009

(65) Prior Publication Data

US 2011/0022848 A1   Jan. 27, 2011

(51) Int. Cl.
*H04L 29/06* (2006.01)

(52) U.S. Cl.
USPC .......................................................... 726/28

(58) Field of Classification Search
USPC ............ 726/26, 27, 28; 705/64, 75; 707/705, 707/781, 783
See application file for complete search history.

(56) References Cited

U.S. PATENT DOCUMENTS

| 2002/0094083 | A1* | 7/2002 | Bhattacharya et al. | 380/231 |
| 2004/0215981 | A1* | 10/2004 | Ricciardi et al. | 713/202 |
| 2010/0241595 | A1* | 9/2010 | Felsher | 705/400 |
| 2011/0066509 | A1* | 3/2011 | Pizano et al. | 705/14.69 |

* cited by examiner

*Primary Examiner* — Edward Zee

(57) ABSTRACT

Techniques for securely storing confidential information associated with a transaction are disclosed. A method for securely storing confidential information may include storing a data set related to a first transaction in a first server, the data set configured to be searchable by an authorized administrator, storing a plurality of encrypted files that include confidential information related to a plurality of transactions in a second server, including a first encrypted file that includes confidential information related to the first transaction, storing an identifier for the first encrypted file, where the identifier is configured to include at least one key required to access the confidential information related to the first transaction, linking the data set to the identifier, and limiting the access to the plurality of encrypted files by the administrator.

21 Claims, 3 Drawing Sheets

METHOD AND APPARATUS FOR STORING CONFIDENTIAL INFORMATION

BACKGROUND

1. Field

This disclosure is generally related to information storage, and more particularly, to techniques for securely storing confidential information associated with a transaction.

2. Background

Confidential information has been stored on servers protected by firewalls and in databases that include established security features and security techniques. These established features have proven inadequate to prevent unauthorized access to the confidential information. Despite these known techniques, hacking and other forms of gaining unauthorized access to confidential information remain a hazard. The previous attempts remain inadequate to provide sufficient security, while efficiently completing the desired transaction and storing information related to the transaction.

SUMMARY

Disclosed herein is a new and improved approach for securely storing confidential information associated with a transaction. In accordance with an aspect of the approach, an apparatus includes a first server storing a data set related to a first transaction, the data set configured to be searchable by an authorized administrator, a second server storing a plurality of encrypted files that include confidential information related to a plurality of transactions, including a first encrypted file that includes the confidential information related to the first transaction, the first server further storing an identifier for the first encrypted file, where the identifier is configured to include at least one key required to access the confidential information related to the first transaction, a link between the data set and the identifier, and code for limiting an administrator's access to the plurality of encrypted files.

In accordance with another aspect of the approach, an apparatus for storing confidential information includes, means for storing a data set related to the first transaction in a first location, the data set configured to be searchable by an authorized administrator, means for storing a plurality of encrypted files that include confidential information related to a plurality of transactions in a second location, including a first encrypted file that includes confidential information related to the first transaction, means for storing an identifier for the first encrypted file, where the identifier is configured to include at least one key required to access the confidential information related to the first transaction, means for linking the data set to the identifier, and means for limiting the access to the plurality of encrypted files by the administrator.

In accordance with another aspect of the approach, a method for securely storing confidential information may include storing a data set related to a first transaction in a first server, the data set configured to be searchable by an authorized administrator, storing a plurality of encrypted files that include confidential information related to a plurality of transactions in a second server, including a first encrypted file that includes confidential information related to the first transaction, storing an identifier for the first encrypted file, where the identifier is configured to include at least one key required to access the confidential information related to the first transaction, linking the data set to the identifier, and limiting the access to the plurality of encrypted files by the administrator.

In accordance with another aspect of the approach, a computer-readable medium embodying a set of instructions executable by one or more processors, may include code for storing a data set related to the first transaction in a first server, the data set configured to be searchable by an authorized administrator, code for storing a plurality of encrypted files that include confidential information related to a plurality of transactions in a second server, including a first encrypted file that includes confidential information related to the first transaction, code for storing an identifier for the first encrypted file, where the identifier is configured to include at least one key required to access the confidential information related to the first transaction, code for linking the data set to the identifier, and code for limiting the access to the plurality of encrypted files by the administrator.

Other systems, methods, aspects, features, embodiments and advantages of the improved approach for securely storing information associated with a transaction disclosed herein will be, or will become, apparent to one having ordinary skill in the art upon examination of the following drawings and detailed description. It is intended that all such additional systems, methods, aspects, features, embodiments and advantages be included within this description, and be within the scope of the accompanying claims.

BRIEF DESCRIPTION OF THE DRAWINGS

It is to be understood that the drawings are solely for purpose of illustration. Furthermore, the components in the figures are not necessarily to scale, emphasis instead being placed upon illustrating the principles of the apparatuses, articles of manufacture and methods disclosed herein. In the figures, like reference numerals designate corresponding parts throughout the different views.

DETAILED DESCRIPTION

The following detailed description, which references to and incorporates the drawings, describes and illustrates one or more specific embodiments. These embodiments, offered not to limit but only to exemplify and teach, are shown and described in sufficient detail to enable those skilled in the art to practice what is claimed. Thus, for the sake of brevity, the description may omit certain information known to those of skill in the art.

The word "exemplary" is used herein to mean "serving as an example, instance, or illustration." Any embodiment, component or variant described herein as "exemplary" is not necessarily to be construed as preferred or advantageous over other embodiments, components or variants. All of the embodiments, components and variants described in this description are exemplary embodiments, components and variants provided to enable persons skilled in the art to make and use the invention, and not necessarily to limit the scope of legal protection afforded the appended claims.

Figure 1:
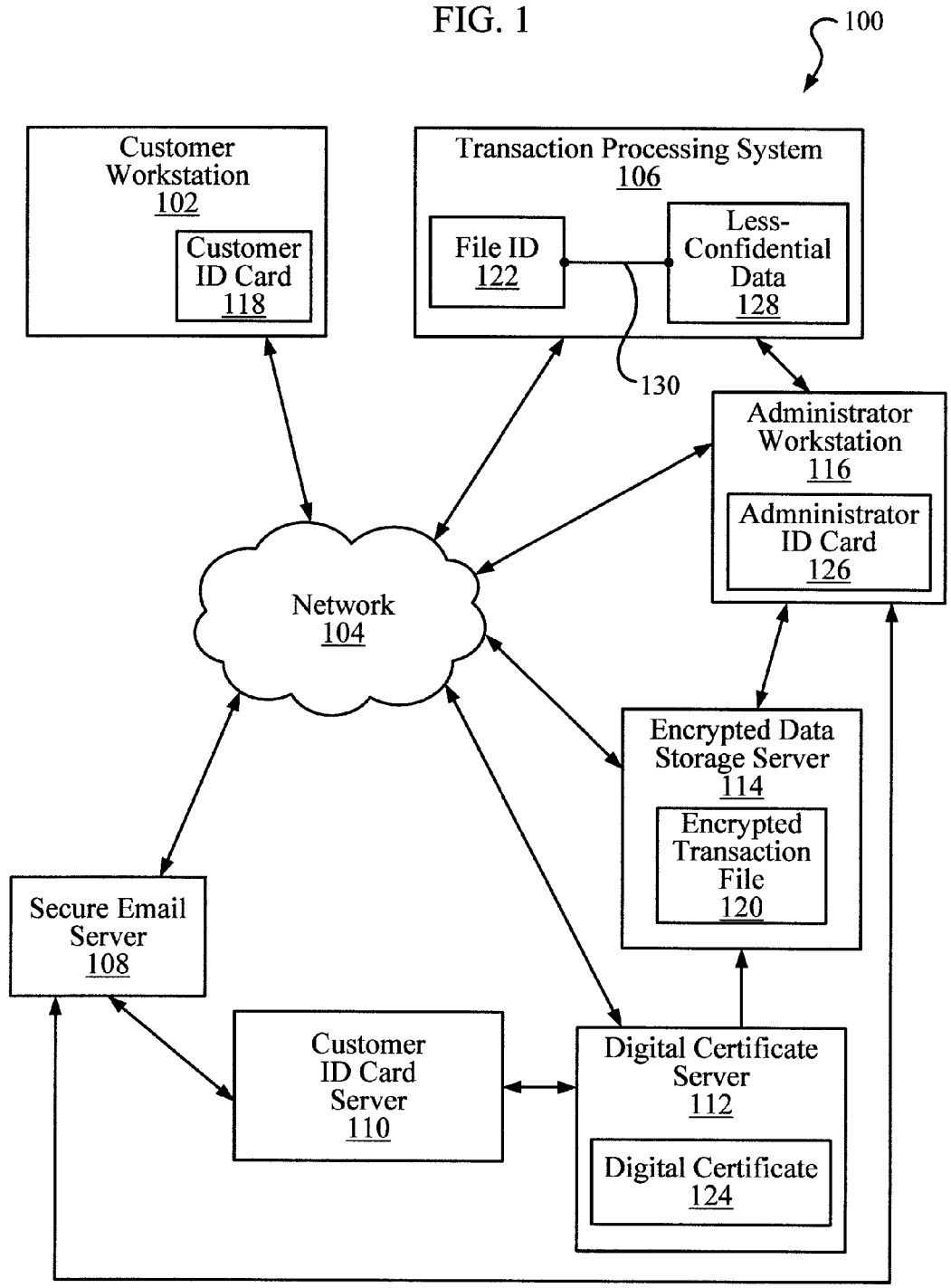
FIG. 1 is a block diagram of a system for storing information associated with a transaction.

FIG. 1 shows a functional block diagram of a secured transaction system 100 for storing confidential information associated with a transaction. System 100 includes a customer workstation 102, a network 104, a transaction processing system 106, a secure email server 108, a customer identification (ID) card server 110, a digital certificate server 112, an encrypted data storage server 114, and an administrator workstation 116. The hardware associated with the individual components of system 100 is generally known to those having ordinary skill in the art. However, the configuration of the hardware, as illustrated herein, is new to the art. Further, in this description, though methods and processes are illustrated and disclosed with reference to system 100 components, and system 100 components are illustrated and disclosed with reference to methods and processes, the methods and processes may be practiced independently of particular components, and the components are not limited to any particular method or process. Instead, the systems, methods, and processes are as stated in the accompanying claims.

Secured transaction system 100 may generally be illustrated and described as including components configured to permit three tasks, processes, and/or methods. A first process, initially illustrated by flowchart 200 of FIG. 2, includes the issuance of a customer identification (ID) card 118. A second process, initially illustrated by flowchart 300 of FIG. 3, includes the completion of a transaction and the creation of an encrypted transaction file 120 and a file ID 122. A third process, initially illustrated by flowchart 400 of FIG. 4, includes allowing a customer and/or an administrator access to the encrypted transaction file 120 under limited circumstances and/or conditions.

Though initially illustrated and described in regard to the creation of a single customer ID card 118, a single encrypted transaction file 120, a single file ID card 122, the systems and methods are capable of creating a plurality of such components associated with a plurality of transactions by a plurality of customers, and may be used by a plurality of administrators. Further, although illustrated and described with a separate customer workstation 102 and administrator workstation 116, in some applications, the customer and the administrator may be the same. For example, in some embodiments, a customer/patient may provide confidential information during a transaction involving a healthcare provider. At a later time, it may be the customer/patient, the administrator/healthcare provider, and an agent of either, that may wish to access the confidential information stored pursuant to the technology disclosed herein. In additional embodiments and applications, customers and/or agents may include, but are not limited to, immigration officers, airline staff, customs official, and agent of customers and administrators, that may wish to access the confidential information stored pursuant to the technology disclosed herein.

Among the benefits associated with the systems and methods described herein is that confidential information associated with respective transactions may be separately encrypted and stored separate from less-confidential information. The less-confidential information may be used to identify a particular transaction, and to identify the file and/or key and/or code required to gain access to the confidential information associated with a respective transaction. Further, the systems and methods illustrated may allow for limitations to be placed upon the access to encrypted transaction information. For example, an administrator may be limited to only accessing information related to a single transaction at a time, or within a set period of time. Thus, the exposure of confidential information to hacking may be minimized.

Figure 2:
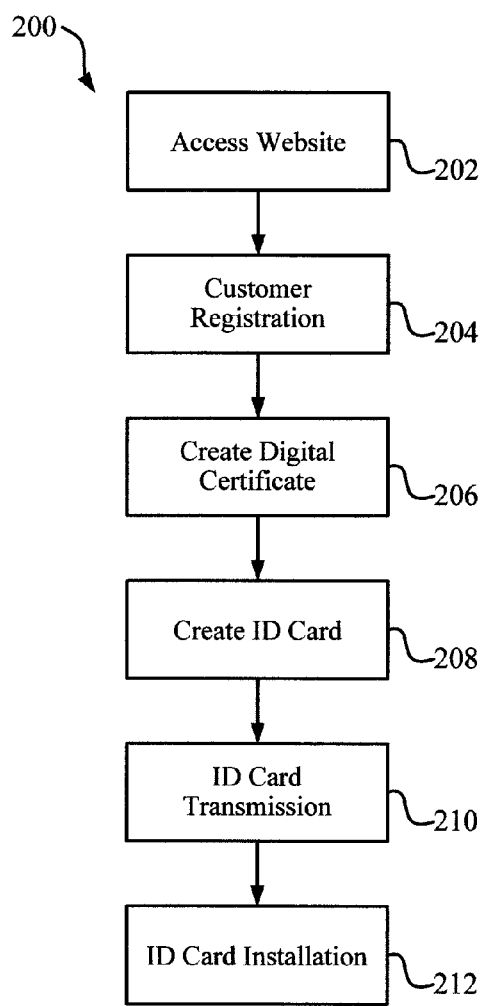
FIG. 2 is a flowchart illustrating a method of issuing a customer identification (ID) card.

FIG. 2 shows flowchart 200 illustrating a method of issuing a customer ID card, including an access website block 202, a customer registration block 204, a digital certificate creation block 206, an ID card creation block 208, an ID card transmission block 210, and an ID card installation block 212. In access website block 202, a customer may access a transaction website associated with transaction processing system 106. The transaction website may be configured to accept customer registration information. Customer registration information may include information associated with the customer that may be used to identify the customer and/or to facility anticipated transactions in which the customer may engage, such as but not limited to, the customer's first name, middle name, last name, business name, email address, home address, email address, credit card information, the credit card codes, bank account information, zip code, or any other information useful in accomplishing anticipated transactions.

In customer registration block 204, the customer may provide the customer registration information through conventional means of website computer data entry. The type of customer may depend upon the particular function of the transaction processing system 106. For example, in some applications the customer may be a purchaser, in other applications, the customer may be a patient, a physician, a legal professional, a financial professional, etc. The customer registration information may be included and/or converted into a customer registration information file that may be transmitted to digital certificate server 112 and/or transaction processing system 106. In some embodiments, an administrator may be informed, for example through secured email server 108 and administrator workstation 116, that the customer is attempting to acquire customer ID card 118. The administer, and/or algorithms associated with administrator workstation 116, may prevent the issuance of customer ID card 118 if issuance criteria are not met, such as if the identity of the customer cannot be confirmed.

In digital certificate creation block 206, digital certificate server 112 may create a digital certificate 124 based upon the registration information file. Digital certificate 124 may be designed to be a unique, or practically unique code. For example, digital certificate server 124 may be configured to generate public and private keys based upon public key infrastructure (PKI) based encryption techniques.

In ID creation block 208, customer ID card server 110, for example a Microsoft windows cardfile personal information manager, may create customer ID card 118, for example as a CRD file. Customer ID card 118 may be an encrypted security file that stores secure certificates used to authenticate a person or device, such as a computer or Web server. Customer ID card 118 may require a password to be opened and may be installed through in a variety of manners, such as but not limited to, a right-click and selection. Customer ID card 118 may include digital certificate 124 and the customer registration information, and/or a subset of information associated with digital certificate 124 and the customer registration information. Customer ID card 118 may be designed to be a unique, or practically unique, code designed to identify the customer, and/or customer workstation 102. In some embodiments, an administrator may have to approve the issuance of customer ID card 118.

In ID card transmission block 210, customer ID card 118 may be transmitted to customer workstation 102 via an email server, for example secured email server 108, and via network 104. Suitable formats for such cards and certificates include, but are not limited to, ".crd" and ".pfx". In ID card installation block 212, the customer ID card 118 may be installed on customer workstation 102, for example, as an icon configured to cooperate with the transaction website and/or transaction processing system 106.

Figure 3:
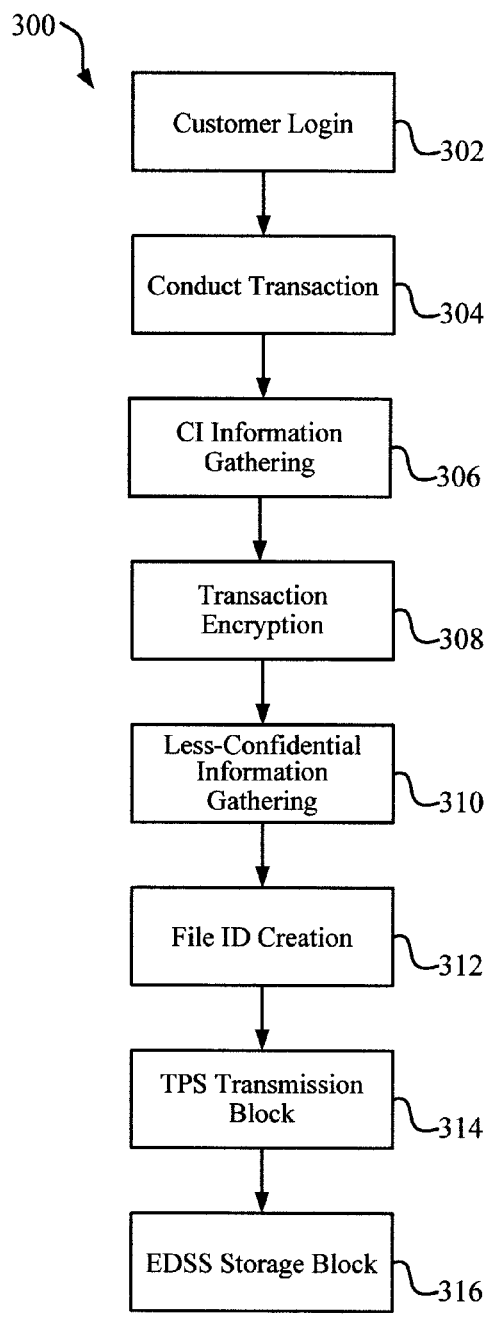
FIG. 3 is a flowchart illustrating a method of completing a transaction and the creation of an encrypted transaction file and a file ID.

FIG. 3 shows flowchart 300 illustrating a method of completing a transaction, including a customer login block 302, a conduct transaction block 304, a confidential information gathering block 306, a transaction encryption block 308, a less-confidential information gathering block 310, a file ID creation block 312, a transaction processing system (TPS) transmission block 314, and an encrypted data storage server (EDSS) storage block 316. In customer login block 302, a customer may log into transaction processing system 106, for example through the transaction website, using customer ID card 118. For example, customer may be able to click on, right click and select, and/or drag-and-drop, an icon associated with customer ID card 118 that establishes a link between customer workstation 102 and transaction processing system 106. Transaction processing system 106 may be configured to uniquely, or practically uniquely, associate customer workstation 102 with customer ID card 118, such as in infocard, as known to those having skill in the art.

In conduct transaction block 304, the customer conducts a transaction in a manner known in the art that may depend upon the purpose or business of the particular transaction processing system 106. For example, the customer may use an electronic shopping cart to select items to be purchased. In confidential information gathering block 306, the customer and/or the transaction processing system 106 may provide confidential information that may be associated with the transaction conducted and/or payment for the transaction conducted. Confidential information may include, for example but not limited to, credit card numbers, zip codes, street addresses, card codes, transaction amounts, transaction item identifiers, receipts, registration information, a subset of registration information, vendor ID, transaction identifiers, etc. Confidential information may be provided using secured socket layer (SSL) encryption. At the time of the transaction, confidential information may be provided to third parties, such as credit card processors.

In transaction encryption block 308, the confidential information of block 306 is encrypted to create encrypted transaction file 120. For example, the confidential information of block 306 may be encrypted using a digital certificate public key associated with digital certificate 124 to create encrypted transaction file 120. In less-confidential information gathering block 310, more benign information, in comparison to the confidential information, may be gathered and/or gleaned from information sources. For example, but not limited to, the customer's first name, middle name, last name, business name, email address, the transaction date, the transaction time, the transaction amount, transaction confirmation number, etc., may be gathered from customer ID card 118, the confidential information, and/or specific data entries provided by the customer at customer workstation 102.

In file ID creation block 312, the file ID 122 is created that uniquely, or practically uniquely, links to the encrypted transaction file 120. Filed ID 122 is also linked, as illustrated by link 130, to a less-confidential data file 128. File ID 22 may be a 22-digit alpha numeric string. The less-confidential data file 128 may be a file or data entry that includes the less-confidential information gathered in block 310.

In TPS transmission block 314, file ID 122 and the less-confidential data file 128 may be transmitted to the transaction processing system 106. In EDSS storage block 316, encrypted transaction file 120 is stored in the encrypted data storage server 114.

Figure 4:
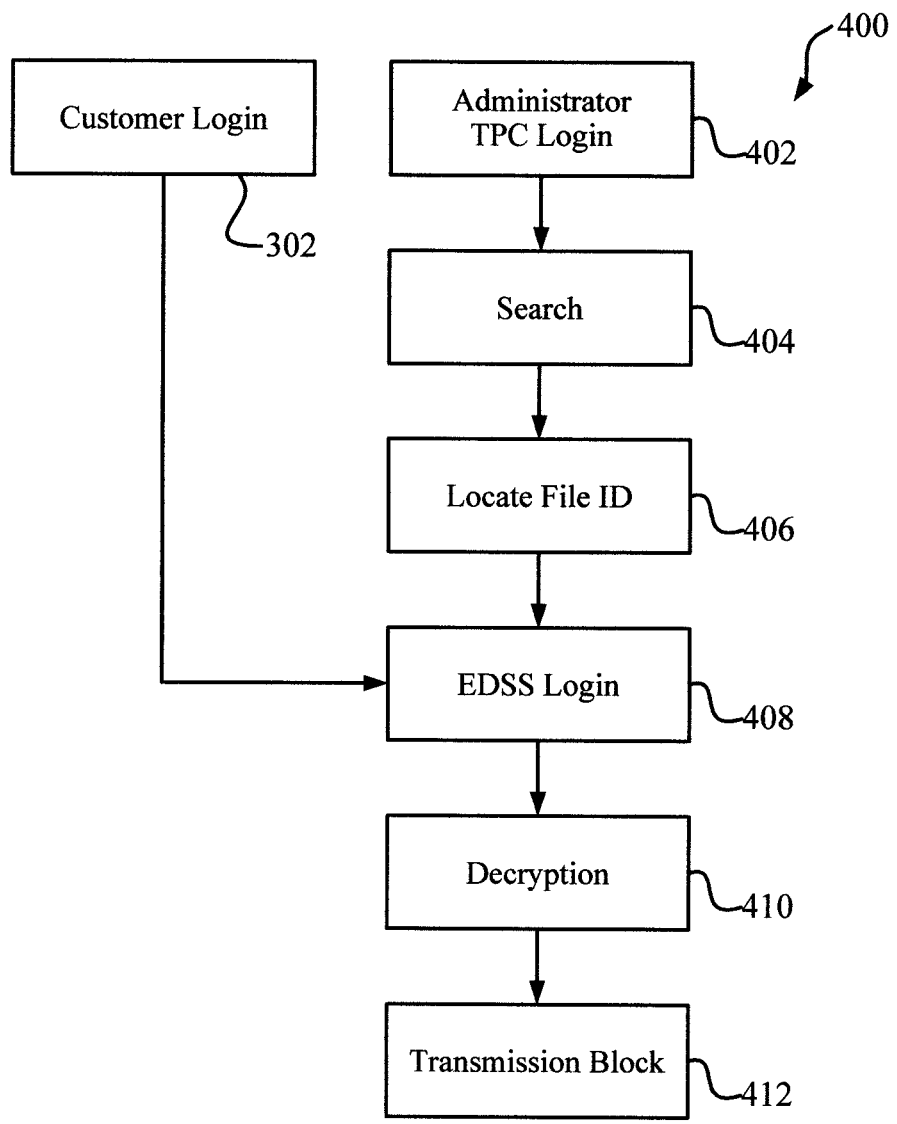
FIG. 4 is a flowchart illustrating a method of allowing a customer and/or an administrator access to the encrypted transaction file under limited circumstances and/or conditions.

FIG. 4 shows flowchart 400 illustrating a method of allowing an administrator and/or access to the encrypted transaction file 120, including an administrator TPC login block 402, a search block 404, a file ID 122 location block 406, an EDSS login block 408, a decryption block 410, and a secured data transmission block 412.

In administrator TPC login block 402, an administrator may log onto the transaction processing system using an administrator ID card 126. Administrator ID card 126 may be created in a manner similar to that illustrated for the creation of the customer ID card 118, using administrator registration information. The administrator registration information used to create the administrator ID card 126 may or may not include confidential information associated with the administrator. Access to encrypted transaction file 120 may also be initiated by a customer after a customer login 302 as previously described in regard to flowchart 300.

In search block 404, the administrator may search for file ID 122 in the transaction processing system 106. For example, the administrator may search a data base of a plurality of less-confidential information files, including less-confidential data file 128. In file ID 122 location block 406, the administrator may identify a particular file ID 122 associated with a particular transaction from the plurality of file IDs associated with a respective plurality of transactions. For example, the administrator may identify a desired file ID 122, from a plurality of additional file ID's (not shown), due to the link 130 established between less-confidential data file 128 and file ID 122.

In EDSS login block 408, the administrator may log into the Encrypted Data Storage Server 114. The administrator may use the Administrator ID card 126 to log into the Encrypted Data Storage Server 114. In decryption block 410, the administrator may decrypt the encrypted transaction file 120 using file ID 12 identified in block 406, and the associated private key from digital certificate 124. In secured data transmission block 412, the administrator may transmit the confidential information decrypted from the encrypted transaction file, for example, via secured email server 108.

Returning to FIG. 1, customer workstation 102 and administrator workstation 116 may be general purpose computers. Customer workstation 102 and administrator workstation 116 may include a combination of software and hardware, for example processor(s), input/output devices, memory element (s), and interfaces, to allow general computing activities along with interacting with network 104, transaction processing system 106, and other portions of system 100.

Customer workstation 102 and administrator workstation 116 may include software and hardware in order to allow icons, for example an icon associated with customer ID card 118, to be displayed on an input/output device such as a display screen. Customer workstation 102 and administrator workstation 116 may also include software and/or hardware configured to allow email interactions, including interactions with secured email server 108.

Network 104 may be a number of networks known to those having ordinary skill in the art, such as, but not limited to, a local area network (LAN), a wide area network (WAN), the Internet, an Intranet, etc. Network 104 allows interaction between various computers and communication systems, such as, but not limited to, the components of system 100 shown in FIG. 1.

Transaction processing system 106 may be a number of computer transaction processing systems used in a number of fields for processing transactions with customers. Transaction processing system 106 may include a uniform resource locator (URL) configured processor, and may host the transaction website. Transaction processing system 106 may be a transaction processing system such as, but not limited to, electronic commerce transaction processing systems, credit card transaction systems, healthcare transaction processing systems, including communications between healthcare providers and patients, financial transaction processing systems, government document issuance systems, proprietary data transaction processing systems, etc. The scope of transaction data included in any particular transaction or application may include, but is not limited to, identification information, financial information, item selection information, personal health information (PHI), legal information, construction contracts and information, business contracts, passport information, driver's license information, and other proprietary and non-proprietary information. Such transaction data is often dependent upon the type of application to which the system 100 is adapted to, for example the electronic commerce transaction processing systems, credit card transaction systems, healthcare transaction processing systems, financial transaction processing systems, proprietary data transaction processing systems, etc.

Transaction processing system 106 may be configured to create encrypted transaction file 120 based on the confidential information associated with a transaction between transaction processing center 106 and customer workstation 102. Secure email server 108 may be a number of email servers known to those having ordinary skill that are configured to encrypt at least a portion of emails prior to transmission, and are configured to receive information required for uniquely encrypting emails. The secured email server 108 may also provide the customer with updates as various events occur that may be associated with a transaction, for example, as a product is shipped the secured email server 108 may send an email to the customer workstation 102. The receipt of the email may prompt the customer to request that an administrator locate and access the encrypted transaction file 120, for example, to change, verify, and/or dispute a transaction.

Customer ID card server 110 may be, for example, an infocard server or a similar server, such as those configured to operate pursuant to systems such as, but not limited to Windows CardSpace, DigitalMe, Higgins Identity Selector, etc. The customer ID card server 110 is configured to create customer ID card 118 based on digital certificate 124 and the customer registration information. For example, the customer identification card server 110 may create customer ID card 118 from the customer registration information and a public key provided by digital certificate server 112.

Digital certificate server 112 may be, for example, but not limited to, a Microsoft certificate server and other servers that generate digital certificates for customers, for example, with 128-bit encryption or 256-bit encryption, etc. Digital certificate server 112 is configured to store a plurality of digital certificates associated with a plurality of customers. Digital certificate server 112 may also be configured to provide a plurality of public keys associated, respectively, with the plurality of digital certificates. The digital certificate server 112 may provide the public key to the customer, and retain the private key for use in decrypting data stored in the encrypted data server 114. The digital certificate may be, for example, a 128-bit, or better, encryption code, as known to those having skill in the art. The private key may also be linked to the file ID 122.

Encrypted data storage server 114 may be configured to store a plurality of encrypted transaction files, such as encrypted transaction file 120. The plurality of encrypted transaction files may be associated, respectively, with a plurality of encryption keys that are required to access a respective encrypted transaction file. Encrypted data storage server 114 may also be configured to associate a plurality of file IDs, for example file ID 122, respectively with the plurality of encryption keys, such that the respective file ID is required to access the respective encrypted transaction file.

One exemplary method for storing confidential information associated with a first transaction may include storing a data set related to the first transaction in a first server, for example, storing less-confidential data file 128 in transaction processing system 106, the data set configured to be searchable by an authorized administrator, for example, less-confidential data file 128 may be searchable by an administrator authorized through administrator workstation 116; storing a plurality of encrypted files that include confidential information related to a plurality of transactions in a second server, for example, storing a plurality of encrypted transaction files in encrypted data storage server 114, including a first encrypted file that includes confidential information related to the first transaction, for example, the plurality of encrypted transaction files may include encrypted transaction file 120; storing an identifier for the first encrypted file, for example storing file ID 122, where the identifier is configured to include at least one key required to access the confidential information related to the first transaction, for example, configuring the file ID 122 to include the private key required to access the confidential information related to the first transaction; linking the data set to the identifier, for example linking less confidential data 128 to file ID 122 through link 130; and limiting the access to the plurality of encrypted files by the administrator, for example, by limiting the administrator ID card and/or the administrator workstation to accessing one of the plurality of encrypted transaction files at a time.

The functionality, operations and architecture depicted by the blocks of method 200, 300, and 400 may be implemented using modules, segments, and/or portions of software and/or firmware code. The modules, segments, and/or portions of code include one or more executable instructions for implementing the specified logical function(s). In some implementations, the functions noted in the blocks may occur in a different order than that shown in FIG. 2-FIG. 4. For example, two blocks shown in succession in FIG. 2-FIG. 4 may be executed concurrently or the blocks may sometimes be executed in another order, depending upon the functionality involved.

Those of skill will further appreciate that the various illustrative functional blocks, modules, circuits, and steps described herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the appended claims.

The various illustrative functional blocks, modules, and circuits disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors or DSPs, one or more microprocessors in conjunction with a DSP core, or any other such configuration.

Software/firmware implementing any of the functions, blocks or processes disclosed herein may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

If implemented in software, the methods, blocks, algorithms, and functions described herein may be stored on or transmitted over as instructions or code on one or more computer-readable media. Computer-readable medium includes both computer storage medium and communication medium, including any medium that facilitates transfer of a computer program from one place to another. A storage medium may be any available medium that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable medium.

The above description of the disclosed embodiments is provided to enable any person skilled in the art to make or use that which is defined by the appended claims. The following claims are not intended to be limited to the disclosed embodiments. Other embodiments and modifications will readily occur to those of ordinary skill in the art in view of these teachings. Therefore, the following claims are intended to cover all such embodiments and modifications when viewed in conjunction with the above specification and accompanying drawings.

What is claimed is:

1. An apparatus for storing confidential information, comprising:
   a first server storing a data set related to a first business transaction of a user, the data set configured to be searchable by an authorized administrator;
   a second server storing a plurality of encrypted files that include confidential information related to a plurality of transactions, including a first encrypted file that includes the confidential information related to the first business transaction of the user;
   the first server further storing an identifier for the first encrypted file, where the identifier is configured to include at least one key required to access the confidential information related to the first business transaction of the user;
   a third server to encrypt the plurality of encrypted files using digital certificates issued to respective users;
   a link between the data set and the identifier; and
   code for limiting the administrator's access to the plurality of encrypted files, the code for limiting including limiting the administrator to accessing one file at a time, wherein the first encrypted file is searchable within the second server only with the identifier.

2. The apparatus of claim 1, wherein the data set includes data related to a completion time for the first transaction.

3. The apparatus of claim 1, wherein the data set includes a customer name.

4. The apparatus of claim 3, wherein the encrypted file is encrypted using a digital certificate associated with the customer, and not associated with any other customer.

5. The apparatus of claim 1, wherein the plurality of encrypted files are the only record of confidential information related to the first transaction that remains available to a transaction processing system after the completion of the first transaction.

6. An apparatus for storing confidential information, comprising:
   means for storing a data set related to a first business transaction of a user in a first location, the data set configured to be searchable by an authorized administrator;
   means for storing a plurality of encrypted files that include confidential information related to a plurality of transactions in a second location, including a first encrypted file that includes the confidential information related to the first business transaction of the user;
   means for storing an identifier for the first encrypted file, where the identifier is configured to include at least one key required to access the confidential information related to the first business transaction of the user;
   means for encrypting the plurality of encrypted files at a third location;
   means for linking the data set to the identifier; and
   means for limiting the access to the plurality of encrypted files by the administrator, the means for limiting including limiting the administrator to accessing one file at a time,
   wherein the first encrypted file is searchable within the means for storing a plurality of encrypted files only with the identifier.

7. The apparatus of claim 6, wherein the data set includes data related to a completion time for the first transaction.

8. The apparatus of claim 6, wherein the data set includes a customer name.

9. The apparatus of claim 8, wherein the encrypted file is encrypted using a digital certificate associated with the customer, and not associated with any other customer.

10. The apparatus of claim 6, wherein the plurality of encrypted files are the only record of confidential information related to the first transaction that remains available to a transaction processing system after the completion of the first transaction.

11. A method for storing confidential information, comprising:

storing a data set related to a first business transaction of a user in a first server, the data set configured to be searchable by an authorized administrator;

storing a plurality of encrypted files that include confidential information related to a plurality of transactions in a second server, including a first encrypted file that includes the confidential information related to the first business transaction of the user;

storing an identifier for the first encrypted file, where the identifier is configured to include at least one key required to access the confidential information related to the first business transaction of the user;

encrypting the plurality of encrypted files in a third server;

linking the data set to the identifier; and limiting the access to the plurality of encrypted files by the administrator, the limiting including limiting the administrator to accessing one file at a time, wherein the first encrypted file is searchable within the second server only with the identifier.

12. The method of claim 11, wherein the data set includes data related to a completion time for the first transaction.

13. The method of claim 11, wherein the data set includes a customer name.

14. The method of claim 13, wherein the encrypted file is encrypted using a digital certificate associated with the customer, and not associated with any other customer.

15. The method of claim 11, wherein the plurality of encrypted files are the only record of confidential information related to the first transaction that remains available to a transaction processing system after the completion of the first transaction.

16. A computer-readable medium embodying a set of instructions executable by one or more processors, comprising:

a non-transitory computer-readable medium comprising code for storing a data set related to a first business transaction of a user in a first server, the data set configured to be searchable by an authorized administrator;

the non-transitory computer-readable medium comprising code for storing a plurality of encrypted files that include confidential information related to a plurality of transactions in a second server, including a first encrypted file that includes confidential information related to the first business transaction of the user;

the non-transitory computer-readable medium comprising code for encrypting the first encrypted file at a third server;

the non-transitory computer-readable medium comprising code for storing an identifier for the first encrypted file, where the identifier is configured to include at least one key required to access the confidential information related to the first business transaction of the user;

the non-transitory computer-readable medium comprising code for linking the data set to the identifier; and the non-transitory computer-readable medium comprising code for limiting the access to the plurality of encrypted files by the administrator, the non-transitory code for limiting including limiting the administrator to accessing one file at a time, wherein the first encrypted file is searchable within the second server only with the identifier.

17. The computer-readable medium of claim 16, wherein the data set includes data related to a completion time for the first transaction.

18. The computer-readable medium of claim 16, wherein the data set includes a customer name.

19. The computer-readable medium of claim 18, wherein the encrypted file is encrypted using a digital certificate associated with the customer, and not associated with any other customer.

20. The computer-readable medium of claim 16, wherein the plurality of encrypted files are the only record of confidential information related to the first transaction that remains available to a transaction processing system after the completion of the first transaction.

21. The apparatus of claim 1, wherein encryption of the encrypted file incorporates a public key in such a manner that the private key is required to decrypt the encrypted file.

* * * * *